United States Patent [19]
Oyler et al.

[11] Patent Number: 5,261,240
[45] Date of Patent: Nov. 16, 1993

[54] FUEL SHROUD SYSTEM WITH SPHERICAL FERRULE/DRAIN CAN INTERFACE

[75] Inventors: Max D. Oyler, Mason; Carroll P. Dials, Cincinnati; Franklin W. Merkley, West Chester, all of Ohio

[73] Assignee: General Electric Company, Cincinnati, Ohio

[21] Appl. No.: 948,569
[22] Filed: Sep. 23, 1992
[51] Int. Cl.⁵ ............................................. F02C 1/00
[52] U.S. Cl. ............................. 60/734; 60/39.094; 285/80
[58] Field of Search .......... 60/734, 39.094, 39.31; 285/80, 81, 261

[56] References Cited

U.S. PATENT DOCUMENTS

| 859,426 | 7/1907 | Betz . | |
|---|---|---|---|
| 2,976,064 | 3/1961 | Croy | 285/165 |
| 4,185,462 | 1/1980 | Morse, II et al. | 60/261 |
| 4,422,675 | 12/1983 | Norris et al. | 285/81 |
| 4,708,371 | 11/1987 | Elsworth et al. | 285/13 |
| 5,094,480 | 3/1992 | Boileau | 285/14 |

Primary Examiner—Richard A. Bertsch
Assistant Examiner—W. J. Wicker
Attorney, Agent, or Firm—Jerome C. Squillaro; John R. Rafter

[57] ABSTRACT

A fuel shroud system has a chamber for draining leaked fuel. The chamber is partly defined by a drain can and a sealing ferrule having a spherical sealing ferrule/drain can interface. The spherical interface allows rotation of the drain can relative to the sealing ferrule about an axis perpendicular to the longitudinal axis of the ferrule, thereby facilitating installation of the drain can. The sealing ferrule also includes an anti-torquing nut to enable the sealing ferrule to be held rigid while the swivel nut is being torqued, thereby preventing torsional static preloads from being applied to the piping system during installation.

19 Claims, 3 Drawing Sheets

FUEL SHROUD SYSTEM WITH SPHERICAL FERRULE/DRAIN CAN INTERFACE

FIELD OF THE INVENTION

This invention relates generally to fuel system piping in a gas turbine engine. Specifically, the invention relates to an improved coupling between fuel system piping and a fuel-actuated component interface which provides a drainage path to a safe environment for fuel in the event of fuel leakage.

BACKGROUND OF THE INVENTION

In a gas turbine aircraft engine air enters at the engine inlet and flows from there into the compressor. Compressed air flows to the combustor where it is mixed with fuel injected via fuel nozzles and the fuel-air mixture is ignited. The hot combustion gases flow through the turbine. The turbine extracts energy from the hot gases, converting it to power to drive the compressor and any mechanical load connected to the drive.

The fuel is supplied from the fuel tank to the fuel nozzles through the fuel manifold, and thereby to the combustor, via the fuel system piping. It is conventional practice to shroud the connection between the fuel system piping and the fuel nozzles. Fuel shroud systems are also used in conjunction with fuel system piping connected to fuel-actuated components, such as the variable stator vane system, the variable bleed valve system and the turbine clearance control system.

The basic purpose of such fuel shroud systems is to provide a drainage path for fuel in the event of a fuel leak at or near the connection of the fuel system piping to the component interface. The fuel shroud system is designed to prevent the leaked fuel from dripping down onto hot surfaces in the engine compartment, which condition is conducive to undesirable combustion.

A conventional fuel shroud system of the type shown in FIG. 1 has two main components: a drain can subsystem, generally designated by numeral 2, and a sealing ferrule 4.

The drain can subsystem includes a drain can nut 2a and a drain can 2b. Drain can nut 2a comprises a substantially cylindrical portion 6 and an annular flange portion 8 projecting radially inward at one end of the cylindrical portion 6. Drain can 2b comprises a substantially cylindrical portion 10 and an annular flange portion 12 projecting radially outward at one end of the cylindrical portion 10. Flange portion 12 has a radial sealing surface 18a. The outer diameter of cylindrical portion 10 of drain can 2b is less than the inner diameter of flange portion 8 of drain can nut 2a, allowing cylindrical portion 10 to pass through the opening defined by flange portion 8. The outer diameter of flange portion 12 of drain can 2b is greater than the inner diameter of flange portion 8 of drain can nut 2a, blocking passage of flange portion 12 through the opening defined by flange portion 8. The exposed surfaces of drain can nut 2a and drain can 2b can be coated with any conventional heat shielding material to prevent overheating of the fuel flowing through sealing ferrule 4.

The drain can 2b is securely mounted on the component interface 14 by way of drain can nut 2a. The inner circumferential surface of cylindrical portion 6 of drain can nut 2a is provided with a thread 16a for coupling with a thread 16b formed on an outer circumferential surface of the component interface 14. When drain can nut 2a is tightened onto the component interface 14, the flange portion 8 of drain can nut 2a clamps the sealing surface 18a of flange portion 12 of drain can 2b against a radial sealing surface 18b of the component interface 14.

A connector nipple 24 is tightly screwed into a threaded bore in interface component 14. The connector nipple may be made of steel while the interface component may be aluminum. The component interface 14 and connector nipple 24, which form the interface component subsystem, each have a bore of predetermined diameter. The bores of component interface 14 and connector nipple 24 communicate to form a fluid channel 20 for carrying fuel.

The sealing ferrule 4 is securely coupled to connector nipple 24 by a swivel nut 26. Sealing ferrule 4 has a fluid channel 22 for carrying fuel from fuel pipe 27. Sealing ferrule 4 and swivel nut 26 form a fuel piping subsystem.

Swivel nut 26 comprises a substantially cylindrical portion 28 and an annular flange portion 30 projecting radially inward at one end of the cylindrical portion 28. The inner circumferential surface of cylindrical portion 28 of swivel nut 26 is provided with a thread 32a for coupling with a thread 32b formed on an outer circumferential surface of the connector nipple 24.

As the swivel nut 26 is screwed onto the connector nipple 24, a sealing surface 34a at one end of connector nipple 24 comes into sealing contact with a corresponding sealing surface 34b formed on one end of the sealing ferrule 4. Sealing surfaces 34a and 34b form a contact seal which prevents leakage of fuel when channel 20 is in fluid communication with channel 22. In accordance with conventional practice, one of the sealing surfaces 34a and 34b can be frusto-conical while the other is generated by rotation of an arc about the axis of symmetry. In particular, sealing surface 34b can be frusto-conical while sealing surface 34a is a spherical section.

The sealing ferrule 4 in accordance with conventional practice comprises three pieces welded together: a tube 36, a connector 38 butt-welded at joint 40 to one end of tube 36, and a bushing 42 brazed at joint 44 to the outer circumferential surface of tube 36. The bushing 42 fits snugly inside the cylindrical portion 10 of drain can 2b to close one end of the annular sealed chamber 46 formed inside drain can 2b.

The outer circumferential surface of bushing 42 forms a sealing surface 48a which contacts an opposing sealing surface 48b formed by the inner circumferential surface of cylindrical portion 10 of drain can 2b. An O-ring 50 is seated in an annular recess formed on sealing surface 50a of bushing 42. O-ring 50 seals the sealed chamber 46 at the interface of sealing surfaces 48a and 48b. Similarly, O-ring 52, which is seated in an annular recess formed on the sealing surface 18a of drain can 2b, seals the sealed chamber 46 at the interface of sealing surfaces 18a and 18b.

Any fuel which leaks through the connector nipple/sealing ferrule contact seal 34 is contained inside the sealed chamber 46. The contained fuel in sealed chamber 46 is drained off to a safe environment via a drain outlet and a drain manifold (not shown in FIG. 1) in a well-known manner.

In the conventional fuel shroud system, a retainer ring 54 is seated in an annular groove 56 formed in the inner circumferential surface of drain can 2b. Retainer ring 54 has an inner diameter which is less than the outer diameter of bushing 42. Thus, retainer ring 54 prevents the sealing ferrule 4 from disengaging the drain can subsystem 2 in the event that swivel nut 26 were to loosen during operation.

The above-described conventional fuel shroud system suffers from several disadvantages.

First, in some applications it is necessary for installation of the drain can that the drain can be rotatable relative to sealing ferrule about an axis of rotation which is transverse to the longitudinal axis of the sealing ferrule. In the conventional fuel shroud system, such rotation is blocked by the outer circumferential sealing surface 48a of the bushing 42.

Second, cracks can form in the weld between tube 36 and connector 38 of sealing ferrule 4. Such cracks can lead to fuel leakage at the tube/connector interface, thereby subverting the integrity and reliability of the fuel piping subsystem.

Third, in those applications where a hose section separates the piping subsystem formed by the swivel nut and sealing ferrule from the section of piping which has rigid connection to the engine, the hose section can become torsionally preloaded when the swivel nut is torqued while being installed on the engine. Such torsional preloading has the potential to cause failure of the hose section. This is also true, but to a lesser degree, where the hose section is replaced by rigid piping from the swivel nut to the mounting connection on the engine. This type of torsional loading can contribute to failure of the rigid piping during operation.

SUMMARY OF THE INVENTION

The general object of the present invention is to improve upon the conventional fuel shroud system by eliminating or ameliorating the foregoing disadvantages. It is also a general object of the invention to provide a fuel shroud system which has improved reliability and is relatively easier to install.

In particular, it is an object of the invention to provide a fuel shroud system having a spherical ferrule/drain can interface which allows the drain can to be rotated about an axis perpendicular to the longitudinal axis of the ferrule. This enables the mechanic to more easily thread the drain can onto the interface component.

A further object of the invention is to provide a fuel shroud system having an improved alignment of the sealing surfaces of the drain can and the interface components, resulting in a better seal with the interface component.

Another object is to provide a fuel shroud system which is subjected to reduced loads arising from misalignment or divergence from perpendicularity of the components making up the piping, drain can and interface subsystems. This object is achieved in accordance with a preferred embodiment of the invention by allowing the drain can to be rotated about an axis perpendicular to the longitudinal axis of the sealing ferrule and by utilizing a one-piece ferrule which reduces tolerance stack-up.

It is also an object of a preferred embodiment of the invention to provide a fuel shroud system having an anti-torquing device which enables the mechanic to hold the piping system rigid while the swivel nut is being torqued. This will prevent the application of torsional static preloads to the piping system during installation of the system.

Another object of the preferred embodiment of the invention is to provide a fuel shroud system in which the number of areas of stress concentration is reduced.

By providing a one-piece sealing ferrule, the additional welds and brazing, which are susceptible to cracking, required to manufacture a ferrule from two or more pieces can be eliminated.

These and other objects are realized in accordance with the invention by providing a fuel shroud system having a spherical sealing ferrule/drain can interface. In accordance with the preferred embodiment, this spherical interface takes the form of a circumferential surface of spherical section on the outer periphery of a bushing of the sealing ferrule. The drain can has a circular cylindrical inner surface which opposes the circumferential surface of spherical section on the outer periphery of the bushing. The spherical interface allows rotation of the drain can relative to the sealing ferrule about an axis perpendicular to the axis of the ferrule, thereby facilitating installation of the drain can. A ring of flexible material is seated in an annular groove formed in the circumferential surface of spherical section of the bushing to seal the sealing ferrule/drain can interface.

In accordance with a further aspect of the invention, the sealing ferrule has an anti-torquing nut integrally formed thereon. The anti-torquing nut allows the mechanic to hold the sealing ferrule rigid while the swivel nut is being torqued, thereby preventing the application of torsional static preloads from being applied to the piping system during installation.

Yet another feature of the invention is that the sealing ferrule has a one-piece construction. This reduces tolerance stackup and eliminates welded or brazed joints which are areas of stress concentration susceptible to cracking.

BRIEF DESCRIPTION OF THE DRAWINGS

These and other advantages of the invention will be better understood when the detailed description of the preferred embodiment of the invention is read in conjunction with the drawings, wherein.

DETAILED DESCRIPTION OF THE PREFERRED EMBODIMENTS

Figure 1:
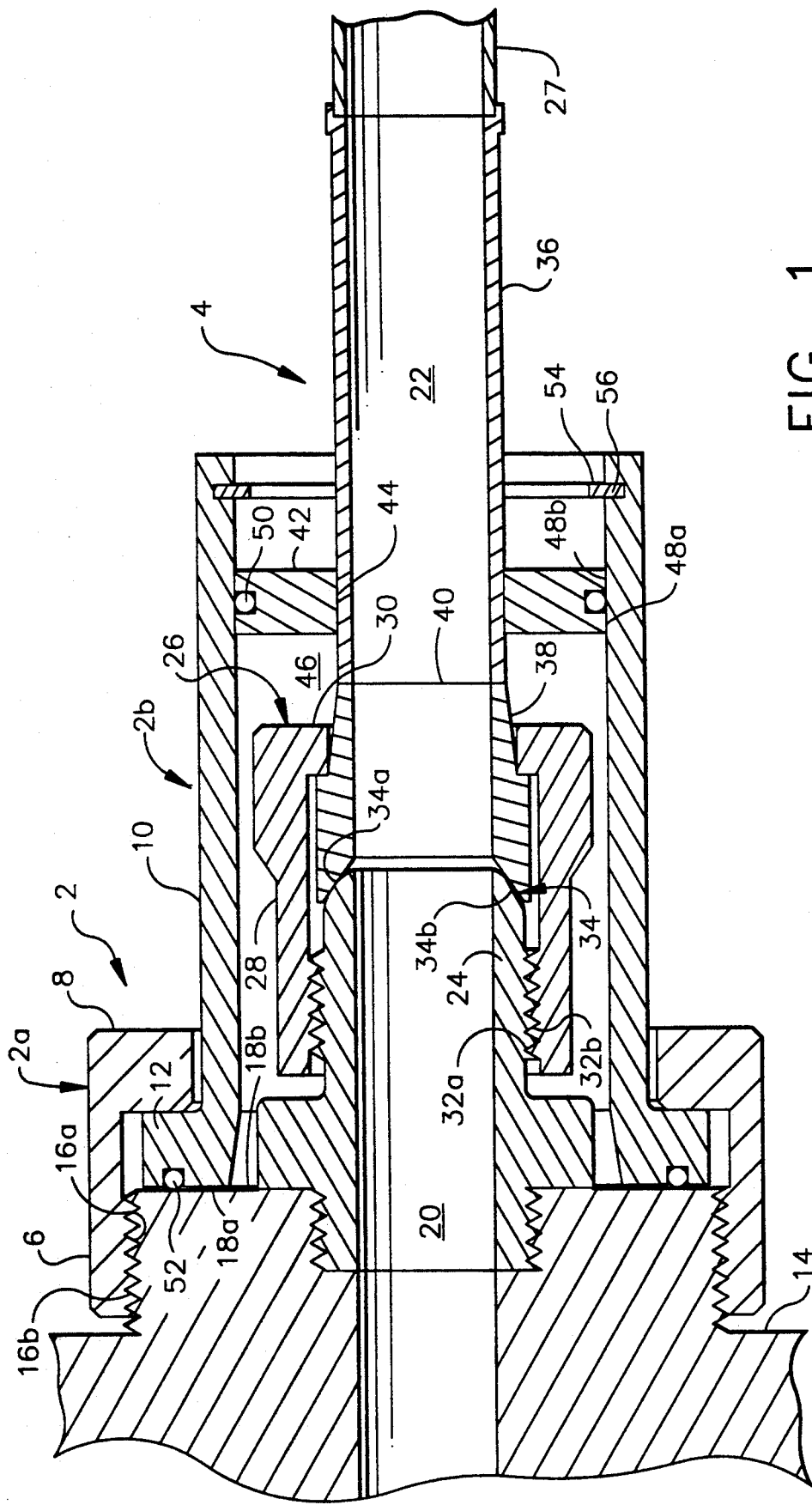
FIG. 1 is a sectional view of a conventional fuel shroud system.
Figure 2:
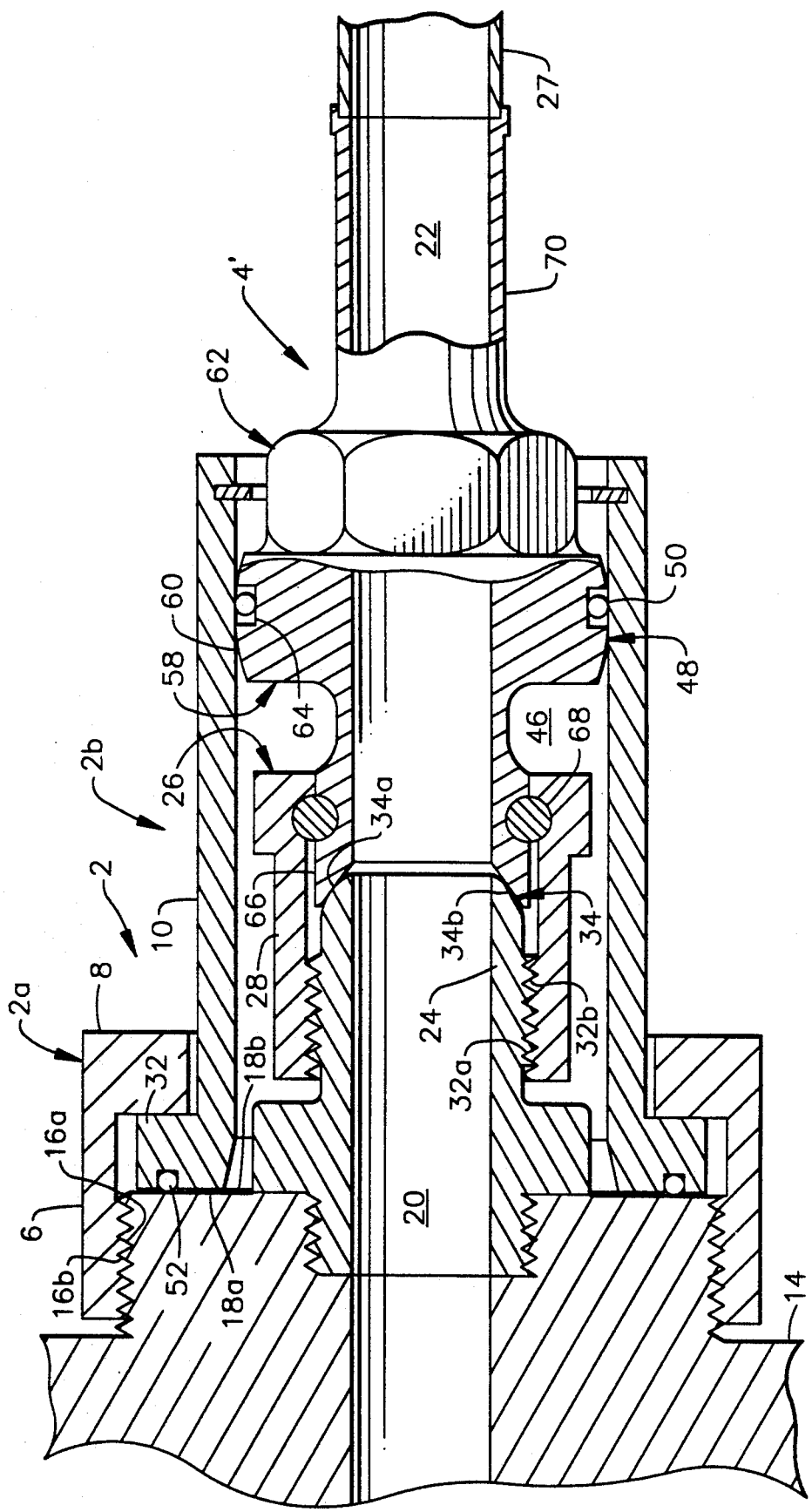
FIG. 2 is a sectional view of a fuel shroud system in an assembled state in accordance with the preferred embodiment of the invention.

The preferred embodiment of the invention is shown in FIG. 2 in the assembled state. Components of the preferred embodiment which are substantially the same as corresponding components depicted in the conventional structure shown in FIG. 1 are designated in FIG. 2 by the same reference numerals used in FIG. 1. The structure and operation of such components have already been described hereinabove and such description will not be repeated for the sake of brevity.

The structure shown in FIG. 2 differs from the conventional structure shown in FIG. 1 primarily in that the sealing ferrule 4' of the invention incorporates a bushing 58 having a circumferential surface 60 of spherical section and an anti-torquing hexagonal nut 62. Surface 60 forms a spherical sealing ferrule/drain can interface which facilitates rotation of the drain can about an axis perpendicular to the longitudinal axis of the sealing ferrule 4'.

The sealing ferrule has a connector portion 66 for coupling to the connector nipple 24 of the component interface subsystem. The connector portion 66 of sealing ferrule 4' is locked into place by a locking ring 68 seated in opposing annular grooves formed in swivel nut 28 and connector portion 66.

The bushing 58, anti-torquing nut 62 and connector portion 66 are integrally joined to a tubular portion 70 having a fluid channel 22. In the assembled state, one end of fluid channel 22 of tubular portion 70 is in fluid communication with the fluid channel of fuel pipe 27, which may take the form of either a flexible hose section or a rigid pipe. The other end of fluid channel 22 is in fluid communication with fluid channel 20 of the interface component subsystem. Fuel flows from channel 22 into channel 20. Contact seal 34 seals against fuel leakage across the interface of nipple connector 24 and sealing ferrule 4' and into chamber 46.

The circumferential surface 60 of bushing 58 has an annular groove 64 in which O-ring 50 is seated. The O-ring 50 seals the sealed chamber 46 at the sealing ferrule/drain can interface 48. O-ring 50, along with O-ring 52, prevent the leakage of fuel from chamber 46 into the engine. Instead, as previously described, the leaked fuel is drained out of the drain can 2b by way of a drain outlet and drain manifold, neither of which are shown in FIG. 2.

Figure 3:
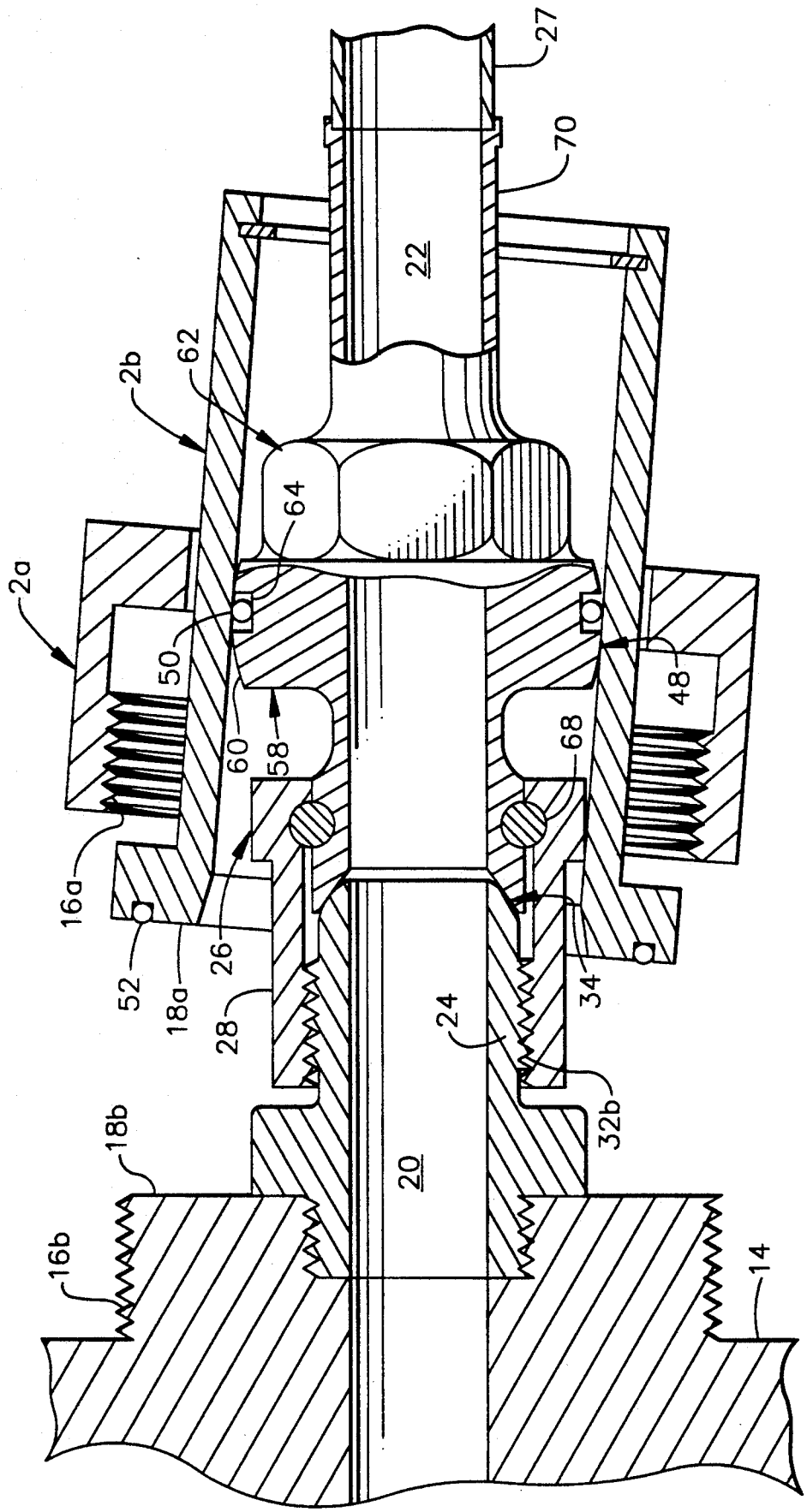
FIG. 3 is a sectional view of the fuel shroud system shown in FIG. 2 depicting a stage in the installation of the drain can.

As best seen in FIG. 3, the circumferential surface 60 of spherical section allows the drain can 2b to be rotated during installation about an axis perpendicular to the longitudinal axis of the sealing ferrule. The ability to rotate drain can 2b facilitates the placement of the drain can subsystem 2 into position in tight spaces as well as threading of the drain can nut 2a onto threads 16b of the interface component 14.

The anti-torquing nut 62 has a head of hexagonal cross section. Prior to placement of the drain can, as shown in FIG. 3, the sealing ferrule 4' is connected to the connector nipple 24 by tightening of swivel nut 26 on threads 32b. During tightening of swivel nut 26, it is advantageous to hold the sealing ferrule 4' rigidly in place using a tool adapted for form-fitting engagement with the hexagonal head of anti-torquing nut 62. This prevents torsional preloading of the flexible hose section or rigid pipe 27.

The preferred embodiment has been described in detail hereinabove for the purpose of illustration only. It will be apparent to a practitioner of ordinary skill in the art of gas turbine engines that various modifications could be made to the above-described structure without departing from the spirit and scope of the invention as defined in the claims set forth hereinafter. In particular, the invention is not limited to a sealing ferrule of one-piece construction, although such construction is preferred. The sealing ferrule may comprise two or more components welded together without losing the advantages provided by the spherical sealing ferrule/drain can interface and the anti-torquing nut incorporated in the preferred embodiments of the invention.

We claim:

1. In a fuel shroud system for coupling a fuel pipe to a fuel-actuated component, comprising:

sealing ferrule means comprising a first channel for fuel having a longitudinal axis, means for coupling to said fuel pipe, first sealing means and a bushing having an outer circumferential surface;

interface means connected to said fuel-actuated component and comprising a second channel for fuel and a second sealing means;

swivel nut means for coupling said sealing ferrule means to said interface means such that said first and second fuel channels are in fluid communication and said first and second sealing means form a contact seal to block fuel leakage therebetween; and drain can means comprising second means for coupling to said interface means and wall means having an inner circumferential surface which interfaces with said outer circumferential surface of said bushing, said bushing of said sealing ferrule means and said wall means of said drain can means partly defining a chamber for receiving fuel leaked through said contact seal;

third sealing means arranged to block fuel leakage between said drain can means and said bushing; and fourth sealing means arranged to block fuel leakage between said drain can means and said interface means, the improvement wherein said inner circumferential surface of said wall means of said drain can means interfaces with said outer circumferential surface of said bushing in a manner that allows rotation of said drain can means relative to said sealing ferrule means about an axis substantially perpendicular to said longitudinal axis while maintaining direct contact between at least a portion of said inner circumferential surface of said wall means and at least a portion of said outer circumferential surface of said bushing.

2. In a fuel shroud system for coupling a fuel pipe to a fuel-actuated component, comprising:

sealing ferrule means comprising a first channel for fuel having a longitudinal axis, means for coupling to said fuel pipe, first sealing means and a bushing having an outer circumferential surface;

interface means connected to said fuel-actuated component and comprising a second channel for fuel and a second sealing means;

swivel nut means for coupling said sealing ferrule means to said interface means such that said first and second fuel channels are in fluid communication and said first and second sealing means form a contact seal to block fuel leakage therebetween; and drain can means comprising second means for coupling to said interface means and wall means having an inner circumferential surface which interferes with said outer circumferential surface of said bushing, said bushing of said sealing ferrule means and said wall means of said drain can means partly defining a chamber for receiving fuel leaked through said contact seal;

third sealing means arranged to block fuel leakage between said drain can means and said bushing; and fourth sealing means arranged to block fuel leakage between said drain can means and said interface means, the improvement wherein said inner circumferential surface of said wall means of said drain can means interfaces with said outer circumferential surface of said bushing in a manner that allows rotation of said drain can means relative to said sealing ferrule means about an axis substantially perpendicular to said longitudinal axis;

wherein said means for coupling of said sealing ferrule comprises a tubular portion and wherein said sealing ferrule means has a one-piece construction, wherein said one-piece construction eliminates areas of stress concentration and reduces tolerance stackup relative to a ferrule having components which are bonded together.

3. In a fuel shroud system for coupling a fuel pipe to a fuel-actuated component, comprising:

sealing ferrule means comprising a first channel for fuel having a longitudinal axis, means for coupling to said fuel pipe, first sealing means and a bushing having an outer circumferential surface;

interface means connected to said fuel-actuated component and comprising a second channel for fuel and a second sealing means;

swivel nut means for coupling said sealing ferrule means to said interface means such that said first and second fuel channels are in fluid communication and said first and second sealing means for a contact seal to block fuel leakage therebetween; and drain can means comprising second means for coupling to said interface means and wall means having an inner circumferential surface which interferes with said outer circumferential surface of said bushing, said bushing of said sealing ferrule means and said wall means of said drain can means partly defining a chamber for receiving fuel leaked through said contact seal;

third sealing means arranged to block the fuel leakage between said drain can means and said bushing; and fourth sealing means arranged to block fuel leakage between said drain can means and said interface means, the improvement wherein said sealing ferrule means further comprises anti-torquing means arranged intermediate said bushing and said means for coupling to said fuel pipe, wherein said anti-torquing means allows said swivel nut means to be torqued without introducing torsional preloads into said fuel pipe.

4. The fuel shroud system as defined in claim 3, wherein said inner circumferential surface of said wall means of said drain can means interfaces with said outer circumferential surface of said bushing in a manner that allows rotation of said drain can means relative to said sealing ferrule means about an axis substantially perpendicular to said longitudinal axis while maintaining direct contact between at least a portion of said inner circumferential surface of said wall means and at least a portion of said outer circumferential surface of said bushing.

5. In a fuel shroud system for coupling a fuel pipe to a fuel-actuated component, comprising:

sealing ferrule means comprising a first channel for fuel having a longitudinal axis, means for coupling to said fuel pipe, first sealing means and a bushing having an outer circumferential surface;

interface means connected to said fuel-actuated component and comprising a second channel for fuel and a second sealing means;

swivel nut means for coupling said sealing ferrule means to said interface means such that said first and second fuel channels are in fluid communication and said first and second sealing means form a contact seal to block fuel leakage therebetween; and drain can means comprising second means for coupling to said interface means and wall means having an inner circumferential surface which interfaces with said outer circumferential surface of said bushing, said bushing of said sealing ferrule means and said wall means of said drain can means partly defining a chamber for receiving fuel leaked through said contact seal;

third sealing means arranged to block fuel leakage between said drain can means and said bushing; and fourth sealing means arranged to block fuel leakage between said drain can means and said interface means, the improvement wherein said sealing ferrule means further comprises anti-torquing means arranged intermediate said bushing and said means for coupling to said fuel pipe;

wherein said inner circumferential surface of said wall means of said drain can means interfaces with said outer circumferential surface of said bushing in a manner that allows rotation of said drain can means relative to said sealing ferrule means about an axis substantially perpendicular to said longitudinal axis;

wherein said outer circumferential surface of said bushing is a spherical section and said inner circumferential surface of said wall means is a circular cylinder having a diameter slightly greater than the diameter of said spherical section.

6. The fuel shroud system as defined in claim 5, wherein said sealing ferrule means has a one-piece construction.

7. In a fuel shroud system for coupling a fuel pipe to a fuel-actuated component, comprising:

sealing ferrule means comprising a first channel for fuel having a longitudinal axis, means for coupling to said fuel pipe, first sealing means and a bushing having an outer circumferential surface;

interface means connected to said fuel-actuated component and comprising a second channel for fuel and a second sealing means;

swivel nut means for coupling said sealing ferrule means to said interface means such that said first and second fuel channels are in fluid communication and said first and second sealing means form a contact seal to block fuel leakage therebetween; and drain can means comprising second means for coupling to said interface means and wall means having an inner circumferential surface which interfaces with said outer circumferential surface of said bushing, said bushing of said sealing ferrule means and said wall means of said drain can means partly defining a chamber for receiving fuel leaked through said contact seal;

third sealing means arranged to block fuel leakage between said drain can means and said bushing; and fourth sealing means arranged to block fuel leakage between said drain can means and said interface means, the improvement wherein said inner circumferential surface of said wall means of said drain can means interfaces with said outer circumferential surface of said bushing in a manner that allows rotation of said drain can means relative to said sealing ferrule means about an axis substantially perpendicular to said longitudinal axis;

wherein said sealing ferrule means further comprises anti-torquing means arranged intermediate said bushing and said means for coupling to said fuel pipe, said anti-torquing means comprising an anti-torquing nut integrally formed on said sealing ferrule means.

8. The fuel shroud system as defined in claim 7, wherein said means for coupling of said sealing ferrule comprises a tubular portion and wherein said sealing ferrule means has a one-piece construction, wherein said one-piece construction eliminates areas of stress concentration and reduces tolerance stackup relative to a ferrule having components which are bonded together.

9. In a fuel shroud system for coupling a fuel pipe to a fuel-actuated component, comprising:
sealing ferrule means comprising a first channel for fuel having a longitudinal axis, means for coupling to said fuel pipe, first sealing means and a bushing having an outer circumferential surface;
interface means connected to said fuel-actuated component and comprising a second channel for fuel and a second sealing means;
swivel nut means for coupling said sealing ferrule means to said interface means such that said first and second fuel channels are in fluid communication and said first and second sealing means form a contact seal to block fuel leakage therebetween; and
drain can means comprising second means for coupling to said interface means and wall means having an inner circumferential surface which interfaces with said outer circumferential surface of said bushing, said bushing of said sealing ferrule means and said wall means of said drain can means partly defining a chamber for receiving fuel leaked through said contact seal;
third sealing means arranged to block fuel leakage between said drain can means and said bushing; and
fourth sealing means arranged to block fuel leakage between said drain can means and said interface means,
the improvement wherein said inner circumferential surface of said wall means of said drain can means interfaces with said outer circumferential surface of said bushing in a manner that allows rotation of said drain can means relative to said sealing ferrule means about an axis substantially perpendicular to said longitudinal axis;
wherein said outer circumferential surface of said bushing is a spherical section and said inner circumferential surface of said wall means is a circular cylinder having a diameter slightly greater than the diameter of said spherical section.

10. The fuel shroud system as defined in claim 9, wherein said sealing ferrule means further comprises anti-torquing means arranged intermediate said bushing and said means for coupling to said fuel pipe.

11. The fuel shroud system as defined in claim 3, wherein said fourth sealing means comprises a first ring of flexible material seated in an annular groove formed in said drain can means and said third sealing means comprises a second ring of flexible material seated in an annular groove formed in said outer circumferential surface of said bushing.

12. The fuel shroud system as defined in claim 9, further comprising a locking ring arranged between a first annular groove formed in said swivel nut means and a second annular groove formed in said sealing ferrule means.

13. In a fuel shroud system for coupling a fuel pipe to a fuel-actuated component, comprising:
sealing ferrule means comprising a first channel for fuel having a longitudinal axis, means for coupling to said fuel pipe, first sealing means and a bushing having an outer circumferential surface;
interface means connected to said fuel-actuated component and comprising a second channel for fuel and a second sealing means;
swivel nut means for coupling said sealing ferrule means to said interface means such that said first and second fuel channels are in fluid communication and said first and second sealing means form a contact seal to block fuel leakage therebetween; and
drain can means comprising second means for coupling to said interface means and wall means having an inner circumferential surface which interfaces with said outer circumferential surface of said bushing, said bushing of said sealing ferrule means and said wall means of said drain can means partly defining a chamber for receiving fuel leaked through said contact seal;
third sealing means arranged to block fuel leakage between said drain can means and said bushing; and
fourth sealing means arranged to block fuel leakage between said drain can means and said interface means,
the improvement wherein said sealing ferrule means further comprises anti-torquing means arranged intermediate said bushing and said means for coupling to said fuel pipe;
wherein said anti-torquing means comprises an anti-torquing nut integrally formed on said sealing ferrule means.

14. The fuel shroud system as defined in claim 13, wherein said fourth sealing means comprises a first ring of flexible material seated in an annular groove formed in said drain can means and said third sealing means comprises a second ring of flexible material seated in an annular groove formed in said outer circumferential surface of said bushing.

15. The fuel shroud system as defined in claim 13, further comprising a locking ring arranged between a first annular groove formed in said swivel nut means and a second annular groove formed in said sealing ferrule means.

16. The fuel shroud system as defined in claim 13, wherein said swivel nut comprises first thread means formed on an inner circumferential surface thereof and said interface means comprises second thread means formed on an outer circumferential surface thereof, said swivel nut being coupled to said interface means by screwing said first threaded means onto said second threaded means.

17. A sealing ferrule for coupling a fuel pipe to a fuel-actuated component interface means, said sealing ferrule comprising channel means for allowing fluid communication between said fuel pipe and said fuel-actuated component interface means, a bushing mounted on said channel means, and means for interfacing with a drain can, wherein said interfacing means is a circumferential surface of spherical section formed on the periphery of said bushing, wherein said circumferential surface of spherical section directly contacts an inner cylindrical surface of said drain can further comprising anti-torquing means for preventing the fuel pipe from being preloaded in torsion when the fuel pipe is coupled to the fuel-actuated component, said anti-torquing means being integrally formed with said channel means and comprising an anti-torquing nut.

18. The sealing ferrule as defined in claim 17, further comprising means for forming a contact seal with said fuel-actuated component interface means, wherein said bushing and said means for forming a contact seal are integrally formed with said channel means.

19. The sealing ferrule as defined in claim 17, wherein said sealing ferrule further comprises a tubular portion and wherein said sealing ferrule has a one-piece construction, wherein said one-piece construction eliminates areas of stress concentration and reduces tolerance stackup relative to a ferrule having components which are bonded together.

* * * * *